United States Patent
Heckel et al.

(10) Patent No.: US 6,823,379 B1
(45) Date of Patent: Nov. 23, 2004

(54) SYSTEM AND METHOD FOR WEB OR FILE SYSTEM ASSET MANAGEMENT AND VISUALIZATION

(75) Inventors: Bjoern Heckel, Davis, CA (US); Rajat Mukherjee, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/579,238

(22) Filed: May 24, 2000

Related U.S. Application Data

(63) Continuation-in-part of application No. 09/390,154, filed on Sep. 3, 1999.

(51) Int. Cl.[7] ............................................. G06F 13/00
(52) U.S. Cl. ..................................................... 709/224
(58) Field of Search ................................ 709/200, 201, 709/203, 212, 213, 216, 217, 218, 219, 224, 227

(56) References Cited

U.S. PATENT DOCUMENTS

| | | | |
|---|---|---|---|
| 5,134,390 A | 7/1992 | Kishimoto et al. | 340/727 |
| 5,396,590 A | 3/1995 | Kreegar | 395/159 |
| 5,517,602 A | 5/1996 | Natarajan | 395/119 |
| 5,590,271 A | 12/1996 | Klinker | 395/326 |
| 5,678,012 A | 10/1997 | Kimmich et al. | 395/327 |
| 5,678,041 A | 10/1997 | Baker et al. | 395/609 |
| 5,682,506 A | 10/1997 | Corby, Jr. et al. | 395/119 |
| 5,696,898 A | 12/1997 | Baker et al. | 395/187.01 |
| 5,708,780 A | 1/1998 | Levergood et al. | 395/200.12 |
| 5,745,755 A | 4/1998 | Covey | 395/619 |
| 5,787,254 A | 7/1998 | Maddalozzo, Jr. et al. | 395/200.58 |
| 5,841,437 A | 11/1998 | Fishkin et al. | 345/346 |
| 5,884,016 A | 3/1999 | Allen et al. | 395/119 |
| 5,889,470 A | 3/1999 | Kaycee et al. | 340/825.07 |
| 5,894,311 A | 4/1999 | Jackson | 345/440 |
| 5,903,732 A | 5/1999 | Reed et al. | 395/200.59 |
| 5,935,210 A * | 8/1999 | Stark | 709/224 |
| 5,941,944 A * | 8/1999 | Messerly | 709/203 |
| 6,144,962 A * | 11/2000 | Weinberg et al. | 707/10 |
| 6,253,204 B1 * | 6/2001 | Glass et al. | 707/102 |
| 6,408,296 B1 * | 6/2002 | Acharya et al. | 707/10 |
| 6,549,944 B1 * | 4/2003 | Weinberg et al. | 709/224 |

FOREIGN PATENT DOCUMENTS

WO     WO 98/48546     10/1998

* cited by examiner

Primary Examiner—Moustafa M. Meky
(74) Attorney, Agent, or Firm—John L. Rogitz

(57) ABSTRACT

A system for visualizing Web assets and hyperlinks includes a domain class that accesses, via respective pipe classes, data classes that contain information on heterogenous assets. Each pipe class transforms information from its respective data class into XML, and the information is then parsed by the domain class and sent to a respective layout class. The layout classes generate graphics objects representative of the parsed information for presentation thereof on a visual display. In this way, both assets and links can be presented for visualizing the assets and, e.g., any broken links that might exist between assets. With this architecture, the system is platform-independent and extensible, and it supports a variety of data sources and integrates external applications and services.

9 Claims, 6 Drawing Sheets

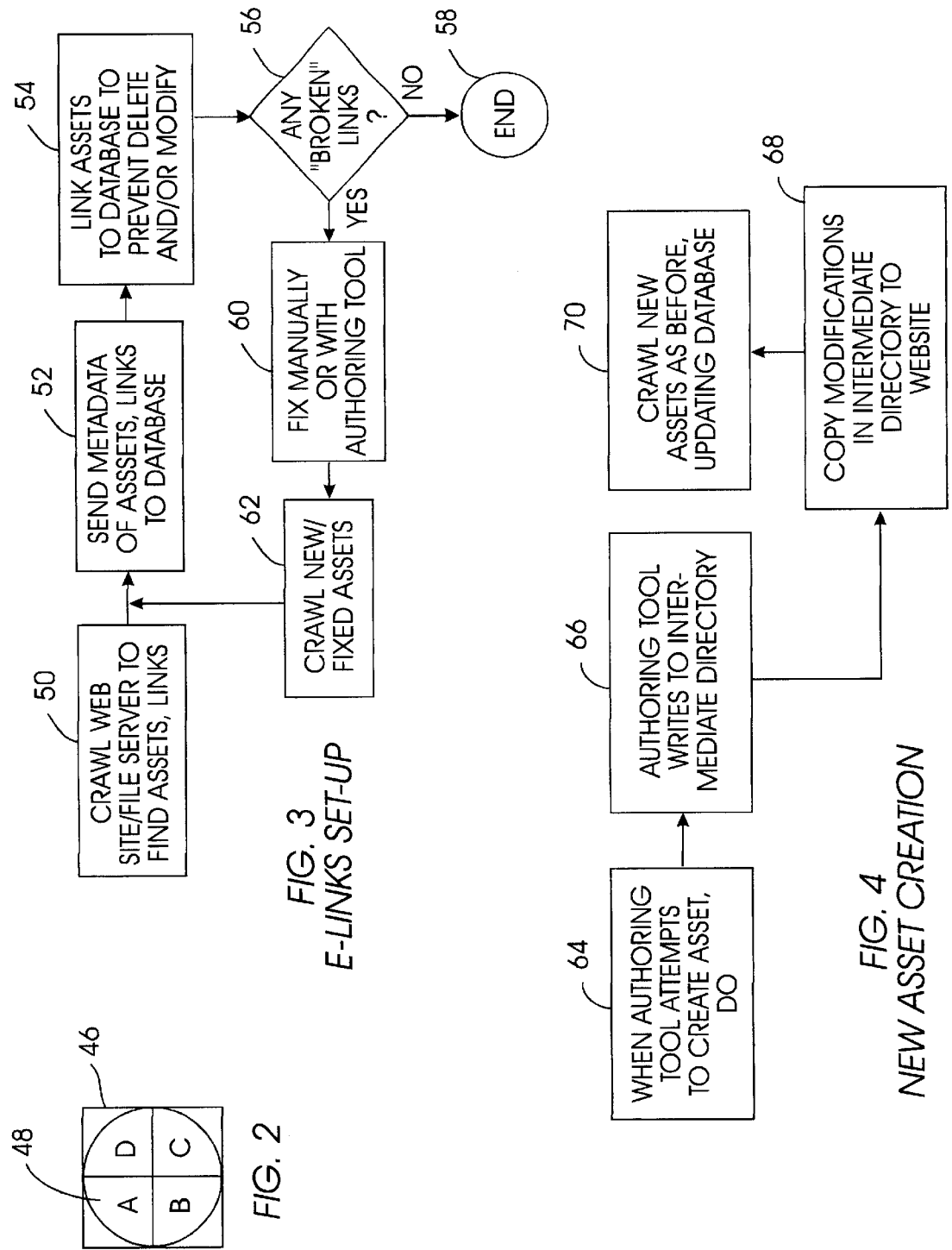

UPDATE OF ASSET

```
<ASSETS>
<GROUP_ASSET>
<GROUPID>2</GROUPID>
<FILE_ASSET>
  <GROUPNUM>2</GROUPNUM>
  <PGROUPNUM>1</PGROUPNUM>
  <URL>HTTP://ELINKS.ALMADEN.IBM.COM/elinks/doc/header_black.html</URL>
  <UID>1</UID>
  <AUTHOR>elinks</AUTHOR>
  <OWNER>dlocal</OWNER>
  <FILESIZE>823</FILESIZE>
</FILE_ASSET>
<FILE_ASSET>
  <GROUPNUM>2</GROUPNUM>
  <PGROUPNUM>1</PGROUPNUM>
  <URL>HTTP://ELINKS.ALMADEN.IBM.COM/elinks/doc/body_index.html</URL>
  <UID>3</UID>
  <AUTHOR>elinks</AUTHOR>
  <OWNER>dlocal</OWNER>
  <FILESIZE>4492</FILESIZE>
</FILE_ASSET>
</GROUP_ASSET>
</ASSETS>
```

FIG. 6

SYSTEM AND METHOD FOR WEB OR FILE SYSTEM ASSET MANAGEMENT AND VISUALIZATION

RELATED APPLICATIONS

This is a continuation in part of U.S. patent application Ser. No. 09/390,154, filed Sep. 3, 1999, incorporated herein by reference, from which priority is claimed still pending.

BACKGROUND OF THE INVENTION

1. Field of the Invention

The present invention relates generally to visualizing assets in a file system or other data storage.

2. Description of the Related Art

In the above-referenced U.S. patent application, we recognized that the World Wide Web and other information repositories such as online databases and file servers afford quick access to a large amount of information, and that such information must be managed. As set forth in the parent application, it is typically the case that assets on the Web, e.g., Web pages, display not only information but also include reference pointers, referred to as hyperlinks, to other assets (e.g., Web pages, images, audio files, etc.) on the Web. A user browser can be operated to select a hyperlink and thereby cause the pointed-to asset to be displayed on a user's computer. It is to be appreciated that while the discussion below focusses on the Web, the present invention is also directed to file servers in which the assets can be files that might include reference pointers to other files in the system.

To create a Web page with attendant hyperlinks, a software program known as an authoring tool can be used. Authoring tools, however, do not guarantee that pointed-to assets are actually published (i.e., written to the Web server). Also, as understood by the present invention authoring tools typically maintain internal/local repositories of information and can perform local checks on the validity of links, but they do not directly manage the final published assets on the Web server and, hence, cannot guarantee link validity after publication. Moreover, since asset management is typically not coordinated, new versions of pointed-to assets can be published and new versions of pointing assets can be published with old, out-of-date hyperlinks. Furthermore, the lack of asset management on the Web server can result in an asset being moved, inadvertently or maliciously, from where the hyperlink indicates the asset is. Often, pointers to assets become valid only after the pointed-to assets are placed by hand on the server via a manual or automated process (e.g., a program). Consequently, it is frequently the case that a user selecting a hyperlink will be presented with a "file not found" message. This is time consuming and frustrating.

The above-referenced application carefully considered the above problems and has provided the solutions set forth therein to provide guarantees that links are not broken (no "file not found" messages). The present invention extends the management to an easily extensible visualization system that supports a variety of heterogenous data sources, that integrates external applications and services to promote the efficient and effective management of data, and that is platform-independent and can provide for remote access.

SUMMARY OF THE INVENTION

A computer-implemented method for visualizing data objects on plural Web servers includes presenting a visual display of Web servers and hyperlinks associated therewith, and determining that a hyperlink is a broken hyperlink when the broken hyperlink points to a data object not represented in a database. The method then includes indicating the broken hyperlink on the visual display. In one preferred embodiment, the hyperlink is indicated as being broken by highlighting the broken hyperlink.

The preferred display presents graphics objects representing heterogenous data objects. A user can manipulate the graphics object to change the database thereby. The graphics objects are presented in accordance with layout classes. Further, a data class contains data objects to be displayed by transforming the objects using an associated pipe class to render a transformed data object and then parsing the transformed data object using a domain class. The parsed data is sent to a layout class, for generating a graphics object to be presented on the display as a representative of the data object. This preferred architecture is extensible and supports a variety of heterogenous data sources, integrates external applications and services to promote the efficient and effective management of data, and is platform-independent.

In another aspect, a computer system for visualizing data objects in a data repository such as at least one Web server or at least one file system includes a database of heterogenous data classes. Each data class contains information on a respective type of data object. At least one domain class accesses the data classes, and plural pipe classes are used by the domain class for accessing respective data classes. Also, plural layout classes receive data from the domain class for presenting graphics objects representative of data objects.

In still another aspect, a computer program product includes a program of instructions embodying method acts that include presenting graphics objects on a display. As intended by the present invention, the graphics objects represent heterogenous data objects. Links between graphics objects are displayed as being representative of links between data objects, and a user can manipulate at least the graphics objects to thereby change the associated data object.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a schematic diagram of a computer program product;

FIG. 3 is a flow chart of the logic for linking database assets to a link table;

FIG. 4 is a flow chart showing the logic for creating new assets while ensuring link integrity;

FIG. 6 is a schematic diagram of metadata associated with remotely-stored assets in accordance with present principles;

DETAILED DESCRIPTION OF THE PREFERRED EMBODIMENTS

The above-referenced application discloses an overall system 10 for managing assets in a file system or across plural Web servers (only first and second Web servers 12, 14 shown in FIG. 1) in a subset of the Internet, such as in an Intranet. For convenience, portions of the disclosure in the above-referenced application will be repeated here. While the discussion below focusses on the Web server application, it is to be understood that the principles of the present invention apply equally to managing distributed file system assets.

Figure 1:
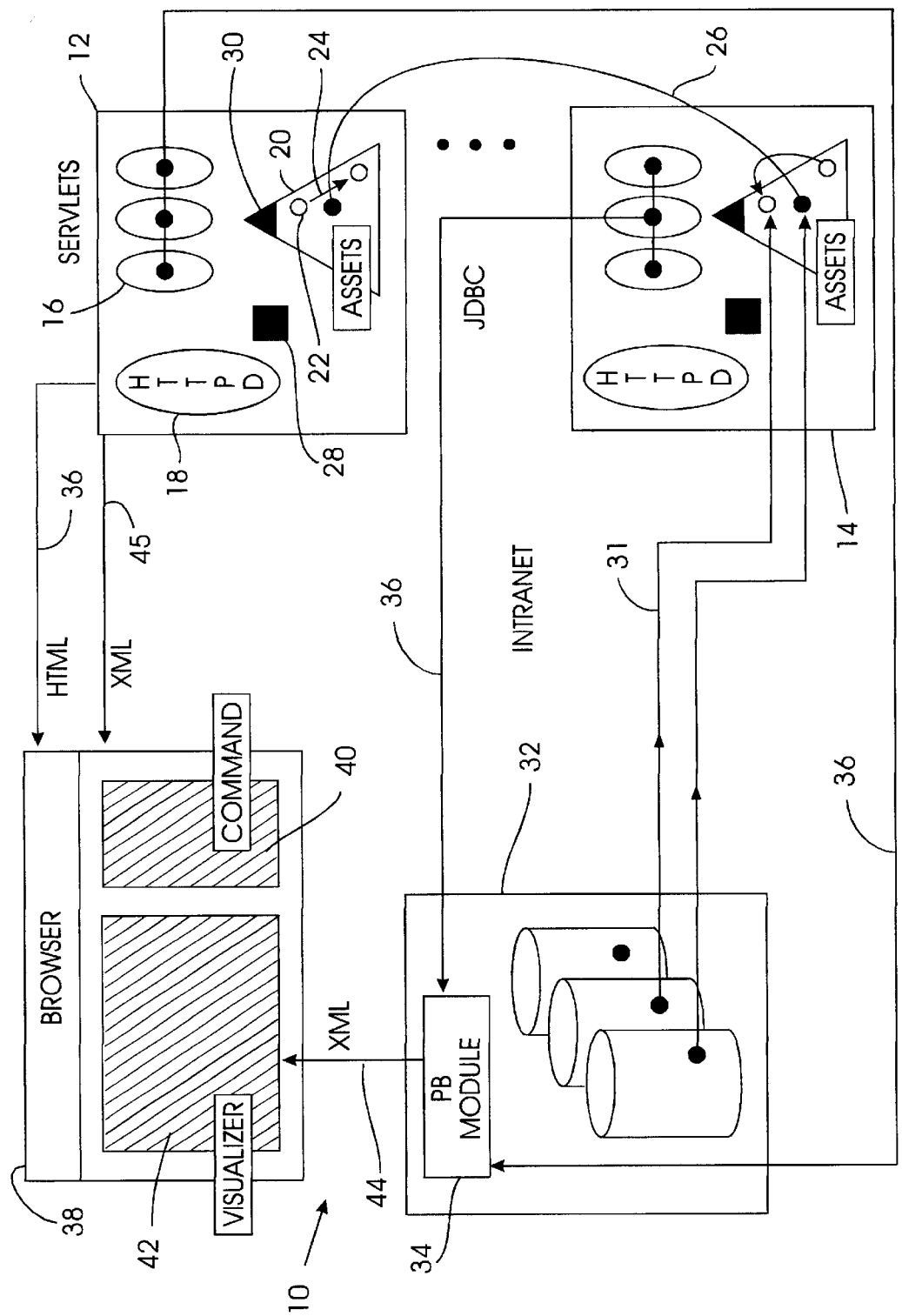
FIG. 1 is a block diagram of the architecture of the management system disclosed in the above-referenced application.

In the embodiment shown in FIG. 1, each Web server 12, 14 includes plural software-implemented server control modules 16 that undertake the server-side logic shown in the flow charts below. As indicated in FIG. 1, the server control modules 16 preferably are Java servlets. Also, each Web server 12, 14 includes a respective conventional hypertext transfer protocol module (HTTPD) 18 (i.e., web server software) for communicating via the Internet using hypertext markup language (HTML), or text, or extensible markup language (XML) in accordance with Web principles known in the art.

FIG. 1 shows that each Web server 12, 14 also includes a respective data repository system 20 that stores assets 22, such as Web pages. The assets 22 can include reference pointers 24, such as hyperlinks, to other assets on the same server 12, 14 or, as indicated by the hyperlink 26, to assets on other Web servers in the system 10.

In the presently preferred embodiment, the data repository system 20 of each Web server 12, 14 in the system 10 includes the data management system known as "DataLinks" and disclosed in co-pending U.S. patent application Ser. No. 08/449,600, owned by the same assignee as is the present invention and incorporated herein by reference, now abandoned. Accordingly, each server 12, 14 includes a respective software-implemented data links file manager (DLFM) 28 and a respective data links filesystem filter (DLFF) 30 that function as set forth in the above-referenced patent application and as summarized herein for convenience. Alternatively, the invention can be used with less preferred systems such as conventional relational database systems, e.g., Oracle database systems. As incorporated into the parent invention, the DataLinks system uses an SQL-based data type to allow robust pointers 31 (e.g., uniform resource listings (URLs)) to the assets 22 to be inserted into a metadata database 32 that includes a software-implemented link manager 34 which undertakes the database-side logic disclosed in greater below. The database 32 can be part of the Web servers 12, 14 or it can be implemented on a computer that is remote from the servers 12, 14. In any case, the pointers 31 establish links between the database 32 and the corresponding assets 22.

In the preferred embodiment, the database 32 includes metadata for each asset 22 and reference pointer 24, 26, as well as other application-specific metadata. As can be appreciated in reference to FIG. 1, the DLFM 28 and DLFF 30 of each server 12, 14 cooperate with link manager 34 to enforce integrity of the assets that are linked to the database 32 via the robust pointer 31. The control modules 16 communicate with the database 32 over the network shown using JDBC communication principles.

As intended by the parent invention, the DLFM 28, DLFF 30, and control modules 16 of a server 12, 14, along with the link manager 34, cooperate to ensure that a pointer 31 can be inserted into the database 32 only if the asset 22 being pointed to by the pointer 31 actually exists on the appropriate server 12, 14. Also, once an asset 22 has been linked to the database 32, the asset 22 cannot be deleted or renamed without authorization from the file manager 28. However, the normal access paths to assets 22 are minimally affected; consequently, normal operations such as read and write are minimally affected, and the web server 18 or the control modules 16 can access these assets 22 directly, without database overhead.

Moreover, when the database 32 is backed up, the assets 22 that have been linked to the database 32 are also automatically archived, providing for coordinated recovery and guaranteeing synchronization. Still further, should it become necessary to recover the database 32 from a backed up version of the database, the assets 22 and assets that are linked thereto are automatically checked and, if necessary, recovered from archive and sent to the servers from which they were backed up. It may now be appreciated that while the assets 22 are physically not part of the database 32, they are logically part of the database 32. As a consequence, the system 10 is highly scalable, and it avoids problems with version control and replication inherent in systems that require redundant physical copies of assets. As mentioned above, direct asset access does not incur database access overhead.

Having thus summarized the preferred DataLinks implementation of the system architecture, the description of FIG. 1 will now be completed. The Web servers 12, 14 can communicate with one or more software-implemented Web browsers 38 that a person can use to input commands using forms or visual interfaces within the browsers 38. Or, an input device 40 can be used. To visualize data such as Web pages on an output device, a monitor 42 can be used. Communication can be via Internet paths 36 using hypertext markup language (HTML) and/or via paths 45 using extensible markup language (XML). For clarity, only the path 36 between the first Web server 12 and the browser 38 is shown, it being understood that the second Web server 14 can also be linked to the browser 38. In addition, a data link 44 can be established between the link manager 34 and the browser 38, to permit a user of the browser 38 to visualize aspects of the database 32. As indicated in FIG. 1, communication over the data link 44 can use extensible markup language (XML). This can happen directly, or via a control on the server that can communicate with the database via the network using, e.g., JDBC.

As intended herein, each of the computers discussed above can be a server computer made by International Business Machines Corporation (IBM) of Armonk, N.Y. Other digital processors, however, may be used, such as personal computers, laptop computers, mainframe computers, palmtop computers, personal assistants, or any other suitable processing apparatus can be used. Likewise, other input devices, including keypads, trackballs, and voice recognition devices can be used, as can other output devices, such as printers, other computers or data storage devices, and computer networks.

In any case, the processor of each computer accesses the appropriate control modules 16, 34 to undertake the logic of the invention, which may be executed by a processor as a series of computer-executable instructions. The instructions may be contained on a data storage device with a computer readable medium, such as a computer diskette 46 shown in FIG. 2 having a computer usable medium 48 with code elements A–D stored thereon. Or, the instructions may be stored on random access memory (RAM) of the computer, on a DASD array, or on magnetic tape, conventional hard disk drive, electronic read-only memory, optical storage device, or other appropriate data storage device. In an illustrative embodiment of the invention, the computer-executable instructions may be lines of JAVA code.

Indeed, the flow charts herein illustrate the structure of the logic of the invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Now referring to FIG. 3, the database setup logic of the invention can be seen. Commencing at block 50, the link manager 34 cooperates with the server control modules 16 to crawl the Web servers 12, 14 to identify the assets 22 and reference pointers 24, 26. Proceeding to block 52, metadata representing the assets 22 and reference pointers 24, 26 is sent to the database 32 for storage therein. Once the database 32 receives the metadata, the metadata is linked to the corresponding assets 22/reference pointers 24, 26 preferably in accordance with DataLinks principles summarized above to prevent deleting, renaming, or otherwise modifying the assets 22 in a way that would render a hyperlink "broken". By "broken" is meant that the hyperlink points to an asset that either does not exist or that exists in a location other than that pointed to, or that otherwise would result in a "file not found" message when the hyperlink is invoked.

At decision diamond 56 it is determined whether any hyperlink is broken by, e.g., invoking the reference pointers 24, 26 one by one and determining whether the pointed-to asset 22 is in fact arrived at. If no broken links are found, the setup process ends at state 58. Otherwise, the logic moves to block 60 to repair the broken reference pointer. This repair can be undertaken "manually" by a user by, e.g., copying a missing asset into the location indicated by the reference pointer. Or, the repair can be undertaken using an authoring tool to create a missing asset or to modify an existing asset appropriately, or by deleting the pointer altogether. The new and/or fixed assets are then crawled at block 62 using the above principles, and then the logic loops back to block 52 as shown.

When a new asset 22 is to be created, the logic of FIG. 4 is invoked to block 64. Moving to block 66, in the currently preferred embodiment the authoring tool attempting to create the asset is modified to publish to an intermediate directory. Next, at block 68, modifications can be made by the authoring tool in the intermediate directory, and these modifications are then copied to the intended Web server 12, 14. At block 70, the new assets are crawled using the logic of FIG. 3, and the database 32 is then updated accordingly.

Figure 5:
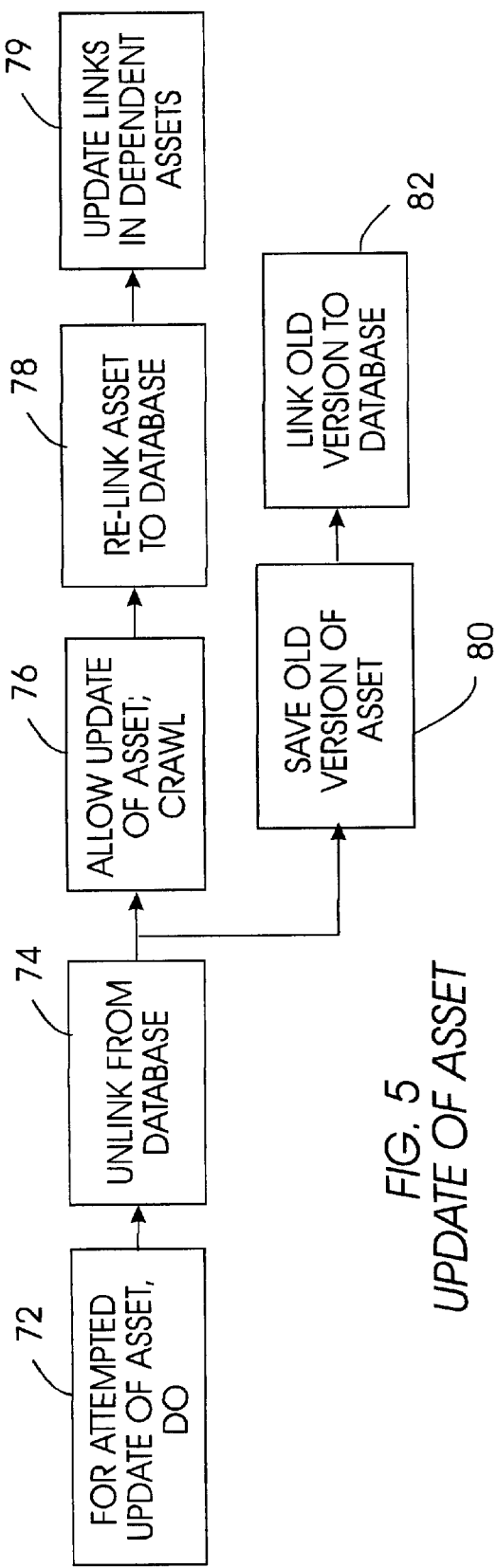
FIG. 5 is a flow chart showing the logic for modifying assets while ensuring link integrity.

When a user wishes to update (e.g., rename or modify content) an asset 22, that is already logically present in the database 32, the logic of FIG. 5 is invoked commencing at block 72. Proceeding to block 74, the asset is unlinked from the database 32, i.e., the robust pointers 31 to the asset sought to be modified are disabled. The update is then allowed to be undertaken at block 76, after which the asset is crawled and then relinked to the database 32 at block 78 by enabling the robust pointers 31. Also, links in dependent assets, i.e., assets that are pointed to from the asset that was updated at block 76, are updated at block 79, creating new versions of these assets as well. In addition, the unmodified version of the asset can be saved at block 80 and linked back to the database 32 at block 82, for archiving purposes.

FIG. 6 shows an XML-based hierarchical display of metadata in the database 32 that can be presented on a visual interface or the monitor 42 (FIG. 1) if desired, using the visualization architecture shown below. As shown, the metadata can include group assets with corresponding identifications, as well as file assets with corresponding numbers, identifications, and hyperlinks. The author and owner of the asset can also be included, as well as other metadata such as file size, comments, content characteristics, etc. The hierarchies can be preserved within these relational tables, with subsequent generation of XML implementing the hierarchical scheme. Data management using the invention advantageously does not require that data (assets) be transferred; metadata transfer is sufficient.

Figure 7:
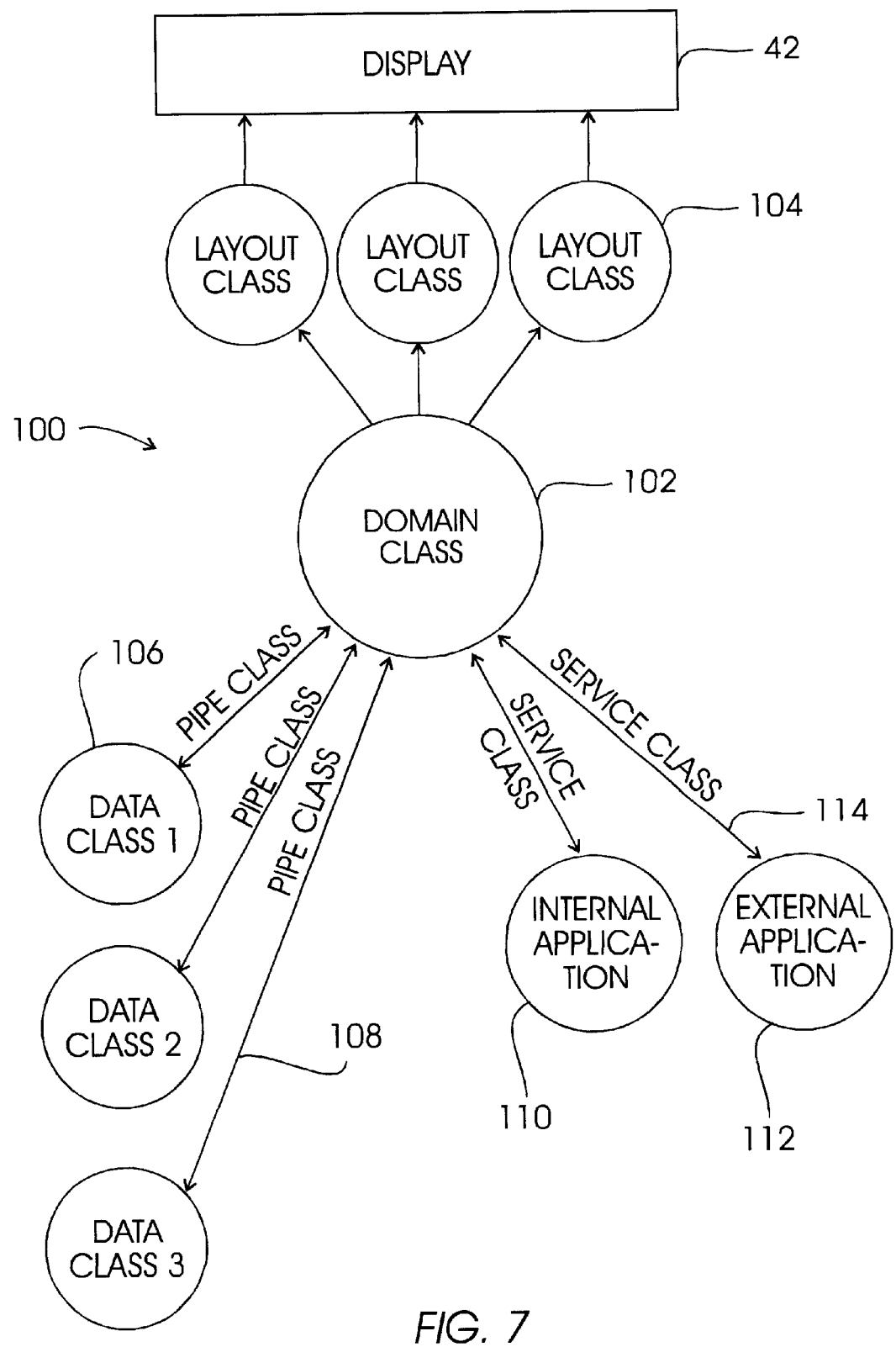
FIG. 7 is a block diagram of the architecture of the present visualization system.
Figure 8:
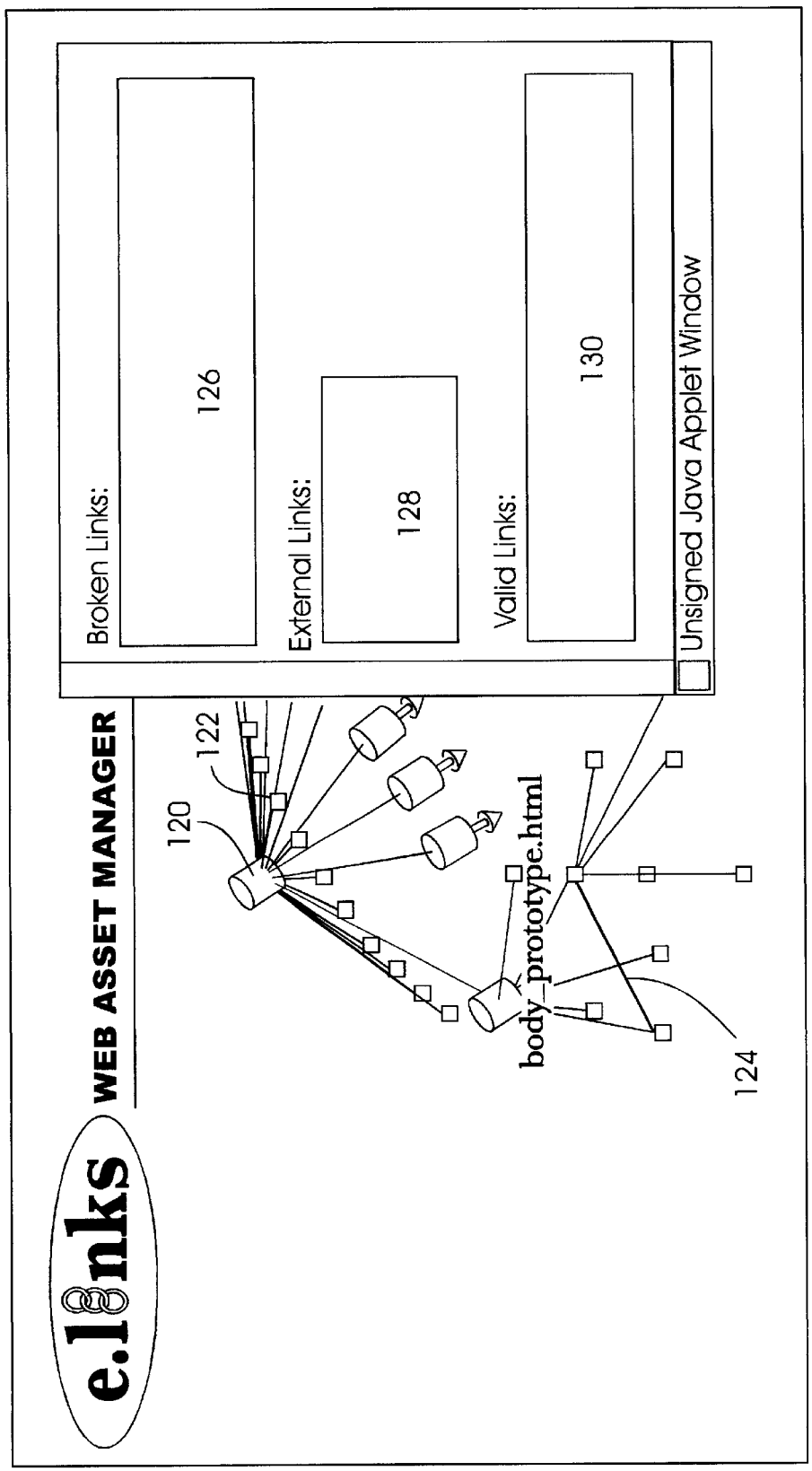
FIG. 8 is a screen display generated by the architecture shown in FIG. 7.

Now referring to FIGS. 7 and 8, the details of the visualization system of the present invention can be seen, for presenting the exemplary screen display of FIG. 8 on the monitor 42 (FIG. 1). As shown, a visualization system 100 includes at least one domain class object 102 (for clarity, only one domain class object 102 shown). The domain class object 102 stores context information about the application domain and manages a (heterogenous) set of data objects. The domain object 102 also processes information it receives from layout class objects 104 to effect changes to data objects in response to user manipulation of graphics objects on the display 42. Moreover, the domain object 102 controls the exchange of information with external data sources such as heterogenous data class objects 106 via respective pipe class objects 108. Specifically, a pipe class object 108 is designed to transform a particular data class object 106 to, e.g., XML, with the transformed object then being sent to the domain class object 102 for parsing thereof. Thus, each pipe object 108 is designed to transform the semantics of a particular data class into XML.

The subsequently parsed data from the domain object 102 is sent to the layout object 104 for generating a graphics object representative of the data object, as defined by the author of the layout object 104. The domain object 102 also manages internal services/applications 110 and external services/applications 112 using respective service classes 114. The basic functionality for these tasks is provided by the root of the domain class hierarchy.

With respect to the layout class objects 104, each layout class object 104 functions as the interface between the user, who can manipulate graphics objects on the display 42, and the domain class object 102. A layout class object 104 is implemented for each visualization technology (e.g., VRML) to provide a set of operations, one of which operations is the ability to manipulate data in the data classes 106 by means of manipulating an associated graphics object on the display 42.

Essentially, a layout object is a set of mappings from an internal data representation to a visual representation, and a layout object 104 is invoked when the domain object 102 sends data, in the form of a set of references representing a data object 106, to the layout object 104. To interpret objects for visualization, a layout object 104 requires the objects to have predetermined attributes. Because inheritance is used to construct the hierarchy of data classes, a layout applies to a particular object and to all its descendants.

Further, a layout object 104 invokes an appropriate event handler in the domain object 102 when a user interacts with the display 42 as by, for example, clicking on a mouse. The domain object 102 then processes the events, which could, for example, result in changing the appearance of a graphics object, altering an attribute of the underlying data object, or performing operations on the objects.

With respect to the data class objects 106, a hierarchy of data classes defines the abstract data types used by the system 100. Each type is represented by an associated data class which defines the attributes of the type of objects within the class as well as methods that can be invoked on objects in the class. Each data class has a type-dependent dialog that can be used to retrieve information about an object and to perform operations on it.

Accordingly, each data class object 106 represents and external entity, e.g., a .gif file, a row in a relational database, or a Web document, or a virtual abstract object such as a cluster of similar documents. A set of basic operations, e.g., event processing, are derived from the root class of the class hierarchy. Other data classes include container classes (that store aggregates of objects) and relation objects, that represent references or links between objects, such as hyperlinks between Web pages. These data objects can reside in various data sources.

In contrast, a pipe object 108 imports data from and exports data to a variety of data sources, including file systems, databases, intranets and the Internet, and servers and servlets. An application can use a set of pipe objects 108 to access different data sources at once. When necessary, a pipe object 108 transforms external data formats into XML, for parsing thereof by the domain object 102 into abstract objects representing the external entities. Pipe objects 108 can also function to perform SQL queries on a database, read the directory structure of a file system, extract hyperlinks from a Web page, and so on.

Processes and operations are represented by service objects 114 that are invoked by the domain object 102. Such services are for example the application of text-clustering to a set of documents, and the extraction of keyframes from a movie file. Remote objects can operate on passed data or on external data sources. Event services can be used to receive and post events that, like user-generated events, can trigger various actions by the domain object 102.

With the above visualization system architecture, the system 100 provides for interactivity by a user with the data underlying the visual displays by, e.g., transforming and reorganizing objects, invoking methods on objects, and changing the way objects are arranged and presented visually. Also, the system 100 integrates external processes and applications by means of the service classes. Furthermore, different ("heterogenous") data types are supported and visualized, such as but not limited to files systems, inter- and intranets, databases, and digital libraries. The modular architecture described above permits rapid development of new visualization environments and is extensible, and is independent of the particular platform and remoteness of data storage.

FIG. 8 shows a screen display that presents plural graphics objects 120, each one representing a Web page in the embodiment shown. Also, lines 122 between the objects 120 represent hyperlinks between the pages. Broken links are highlighted, as by, e.g., the highlighted line 124. Other methods of indicating broken links can be used, e.g., by placing an "X" on the link, or showing an incomplete line, and so on. Broken links are identified in a broken link box 126, external links are listed in an external link box 128, and valid links listed in a valid link box 130. As mentioned above, by means of a mouse/cursor a user can manipulate the objects 120, 122, 124 to generate events that are handled by the domain object 102 discussed above.

While the particular SYSTEM AND METHOD FOR WEB ASSET MANAGEMENT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer-implemented method for visualizing data objects on plural Web pages, comprising the acts of:
   presenting a visual display of Web pages and hyperlinks associated therewith;
   determining that a hyperlink is a broken hyperlink when the broken hyperlink points to a data object not represented in a database; and
   indicating the broken hyperlink on the visual display, wherein the display presents graphics objects representing heterogenous data objects, the graphics objects being presented in accordance with layout classes, and a data class containing a data object to be displayed and having first semantics is transformed by an associated pipe class to render a transformed data object having second semantics different from the first semantics, the second semantics being XML.

2. The method of claim 1, wherein the act of indicating includes highlighting the broken hyperlink.

3. The method of claim 1, further comprising parsing the transformed data object using a domain class.

4. The method of claim 3, further comprising sending a parsed, transformed data object to a layout class, for generating a graphics object to be presented on the display as a representative of the data object.

5. The method of claim 4, further comprising establishing interfaces between the domain class and internal and external applications using respective service classes.

6. The method of claim 4, wherein the method is extensible and supports a variety of heterogenous data sources, integrates external applications and services to promote the efficient and effective management of data, and is platform-independent.

7. The method of claim 1, comprising presenting graphics objects on the display representative of data objects in the database, and permitting a user to manipulate the graphics object to change the database thereby.

8. A computer system for visualizing data objects in a data repository such as at least one Web page or at least one file system, comprising:
   a plurality heterogenous data classes, each data class containing information on a respective type of data object;

at least one domain class accessing the data classes, the domain class storing context information about an application domain, the domain class managing the heterogenous data objects and processing information from layout class objects to effect changes to data objects in response to user manipulation of graphics objects on a display;

plural pipe classes used by the domain class for accessing respective data classes to transform semantics associated with at least one data class, a pipe object executing at least one of: performing SQL queries on a database, reading a directory structure of a file system, and extracting hyperlinks from a Web page; and plural layout classes receiving data from the domain class for presenting graphics objects representative of data objects.

9. The system of claim 8, further comprising plural service classes for interfacing between the domain class and respective applications to facilitate data exchange between the domain class and the applications.

* * * * *